United States Patent
Brown et al.

(10) Patent No.: US 6,935,569 B2
(45) Date of Patent: Aug. 30, 2005

(54) OIL COOLER BYPASS VALVE

(75) Inventors: Lanny D. Brown, Lexington, MI (US); John S. Leen, Carsonville, MI (US)

(73) Assignee: Huron, Inc., Lexington, MI (US)

( * ) Notice: Subject to any disclaimer, the term of this patent is extended or adjusted under 35 U.S.C. 154(b) by 0 days.

(21) Appl. No.: 10/822,635

(22) Filed: Apr. 12, 2004

(65) Prior Publication Data

US 2004/0232249 A1 Nov. 25, 2004

Related U.S. Application Data

(63) Continuation-in-part of application No. 10/330,695, filed on Dec. 27, 2002, now Pat. No. 6,719,208, which is a continuation-in-part of application No. 09/945,037, filed on Aug. 31, 2001, now Pat. No. 6,499,666.

(51) Int. Cl.[7] .................................................. F01P 7/02
(52) U.S. Cl. ..................................... 236/34.5; 236/93 R
(58) Field of Search ........................ 236/34.5, 34, 93 A, 236/93 R, 99 K

(56) References Cited

U.S. PATENT DOCUMENTS

| | | | | |
|---|---|---|---|---|
| 3,404,837 A | * | 10/1968 | James ........................ 236/34.5 |
| 3,554,440 A | * | 1/1971 | Austin et al. ............... 236/34.5 |
| 3,754,706 A | | 8/1973 | Tao |
| 3,913,831 A | | 10/1975 | Talak |
| 4,181,611 A | * | 1/1980 | Rubenstein et al. ......... 210/149 |
| 4,190,198 A | * | 2/1980 | Casuga et al. ............. 236/34.5 |
| 4,196,847 A | * | 4/1980 | Gobien ...................... 236/34.5 |
| 4,360,055 A | | 11/1982 | Frost |
| 4,398,662 A | | 8/1983 | Costello |
| 4,648,815 A | * | 3/1987 | Williams ...................... 418/84 |
| 4,836,276 A | * | 6/1989 | Yamanaka et al. ............ 165/51 |
| 4,846,219 A | * | 7/1989 | Schaefer ..................... 137/557 |
| 5,228,618 A | * | 7/1993 | Afshar ....................... 236/34.5 |
| 5,385,296 A | * | 1/1995 | Kurz et al. ................ 236/34.5 |
| 5,791,557 A | * | 8/1998 | Kunze ........................ 236/34.5 |
| 5,979,778 A | * | 11/1999 | Saur .......................... 236/34.5 |
| 6,012,550 A | | 1/2000 | Lee |
| 6,126,818 A | * | 10/2000 | Duerrstein et al. ......... 210/132 |

FOREIGN PATENT DOCUMENTS

| | | | |
|---|---|---|---|
| DE | 2755462 B | * | 5/1979 |
| JP | 406207685 A | * | 7/1994 |

* cited by examiner

*Primary Examiner*—William E. Tapolcai
*Assistant Examiner*—Mohammad M. Ali
(74) *Attorney, Agent, or Firm*—Harness, Dickey & Pierce, PLC

(57) ABSTRACT

A valve actuating mechanism for a transmission/engine fluid cooler bypass valve of the type in which a responsive element expands to urge a valve member against a valve seat and thereby causes transmission fluid to flow through an oil fluid cooler. A cast valve housing is utilized which is interposed between the cooler and the oil source. The valve actuating mechanism is designed to allow fluid to pass through the valve once the fluid has reached an elevated pressure level.

19 Claims, 14 Drawing Sheets

US 6,935,569 B2

OIL COOLER BYPASS VALVE

CROSS-REFERENCE TO RELATED APPLICATIONS

This application is a continuation-in-part application of U.S. patent application Ser. No. 10/330,695 filed on Dec. 27, 2002 now U.S. Pat No. 6,719,208, which is a continuation-in-part application of U.S. patent application Ser. No. 09/945,037 filed on Aug. 31, 2001, now U.S. Pat. No. 6,499,666. The disclosure of the above applications is incorporated herein by reference.

FIELD OF THE INVENTION

The present invention relates to oil cooler bypass valves, and more particularly to a bypass valve which is coup able to an oil source which is thermally responsive to changes in oil temperatures.

BACKGROUND OF THE INVENTION

Oil cooler bypass valves are used in conjunction with engines, transmissions, power steering systems, and hydraulic systems. They are designed to provide a flow path by which oil passing to the valve from the oil source is returned without passing through a heat exchanger during warm-up periods.

Typical transmission bypass valves have several connecting joints and complicated return features which increases costs and the likelihood of failures caused by leaks. In most prior art systems, the valve member is an integral part of a thermally responsive element which expands to cause the valve member to engage the valve seat. Once seated such a valve member is susceptible to at least two malfunctions. It is impossible to unseat the valve member to relieve excessive system pressures which may occur if the valve ports are improperly connected to the cooler or in the event the oil line is damaged or blocked or the cooler itself has become inoperable. Secondly, the components of the bypass valve are often damaged when the thermally responsive element continues to expand, which sometimes occurs when the cooler is overloaded and the oil heats excessively. Such damage can include cracking of the valve member mounting, or internal failure of the valve components. In either case the bypass valve is unfit for further service.

SUMMARY OF THE INVENTION

According to the present invention, an oil/fluid cooler bypass valve is provided for use in conjunction with a cooling system of the type which includes a manifold type valve housing having a valve chamber communicating with an oil/fluid supply, fluid return, cooler supply, and cooler return lines. A valve member having a cooling position for directing fluid from the fluid supply line to the cooler supply line for circulation through a cooler, and then from the cooler return line to the oil return line. The valve has a warm-up position for directing oil from the oil supply line back to the oil return line, thus bypassing the heat exchanger.

The valve actuation mechanism of the present invention is operative to move the valve member between its warm-up and cooling positions and comprises an element responsive to changes in temperature or pressure of the fluid prior to entry to the cooler. The responsive element is integral with the valve member. The valve member is enclosed with a manifold which is fastened directly to the oil containing body. In one embodiment of the invention, the manifold is directly seated against the oil containing body.

In another embodiment of the present invention, the valve body has a pair of integral input and output ports. Machined into the cavity about the ports are a pair of notches configured to accept O-ring seals. These O-ring seals function to seal the ports when they are bolted directly onto the oil containing body.

In another embodiment of the present invention, an insertable valve element is disclosed. The valve element has a component which is responsive to changes in temperatures. The thermal component has a first valve bearing surface which mates upon a first valve seat within the valve body and a second bearing element which seals a second valve seat. Disposed between the first valve seat and an annular flange on the thermal element is a first spring which functions to bias the first bearing surface against the first valve seat at temperatures above a pre-determined level. A second bi-pass spring is disposed between the thermal element and the mounting member. The mounting member is used to fixably couple the valve element within the valve body.

In yet another embodiment of the present invention, the valve element having a sliding valve component is disclosed. The sliding valve component has an axial through bore which mates to an outer surface of a thermal element. The sliding valve member further has a through passage which regulates the flow of oil through the valve.

Other objects and features of the invention will become apparent from consideration of the following description taken in connection with the accompanying drawings.

DETAILED DESCRIPTION OF THE PREFERRED EMBODIMENTS

Figure 1:
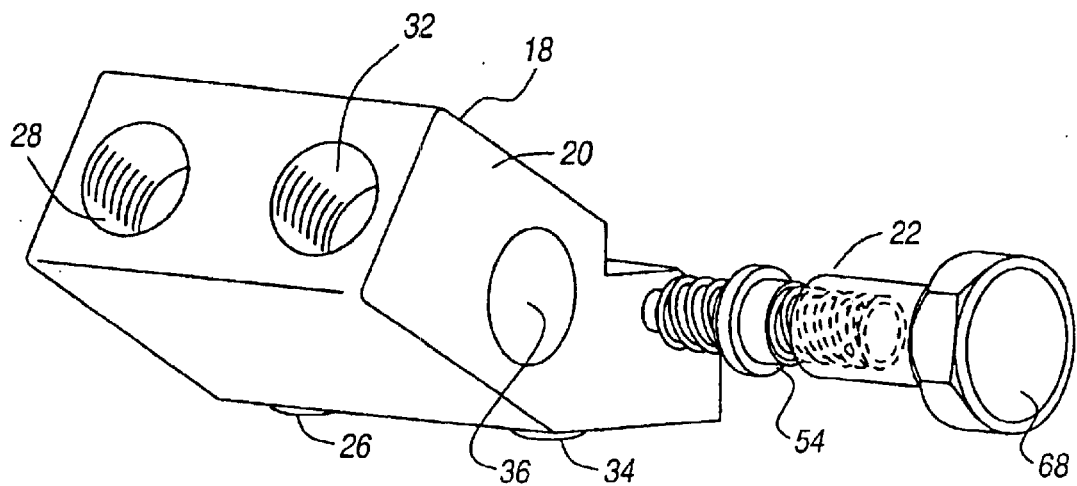
FIG. 1 is an exploded perspective view of a first embodiment of the present invention.
Figure 2:
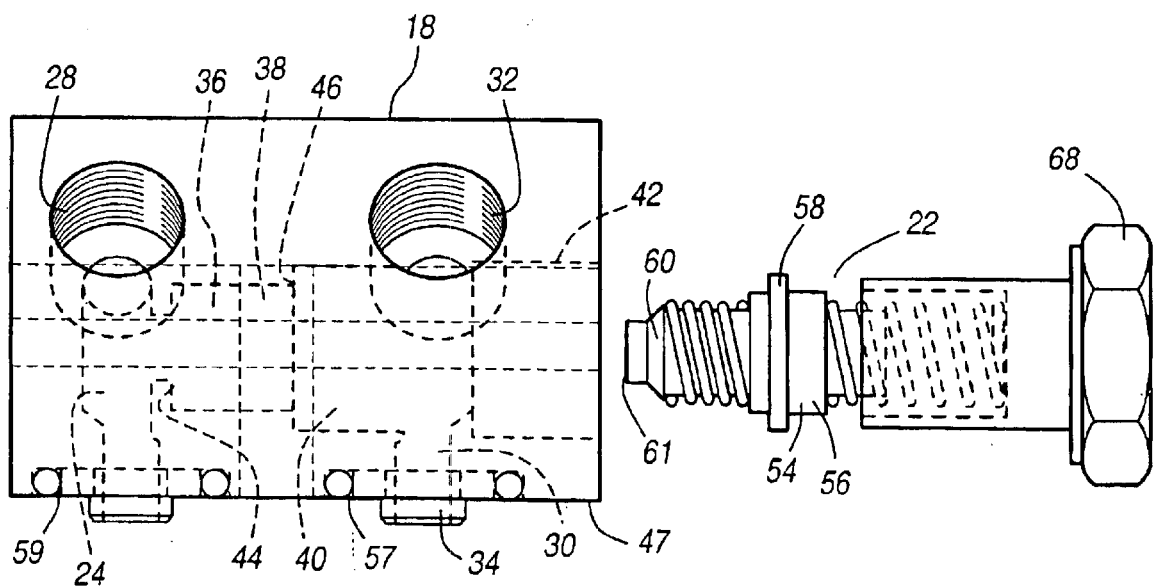
FIG. 2 is an exploded side view of the bypass valve of FIG. 1.

Referring now to FIGS. 1–6, there is illustrated a fluid cooler bypass valve 18 which can be connected to a transmission, engine or power steering fluid pump. The valve 18 is primarily formed by a housing 20 and valve element 22. The housing 20 defines a heat exchanger bore 24 having an input port 26 and a heat exchanger output port 28. The housing further defines a fluid return bore 30 having a return input port 32 and a return output port 34. Disposed between the heat exchanger bore 24 and the return bore 30 is a bypass passage 36. The bypass passage 36 is configured to accept the valve element 22. The bypass passage 36 has a first portion 38 having a first diameter and a second portion 40 having a second diameter which is greater than the first diameter. A threaded portion 42 facilitates the coupling of the valve element 22 to the housing 20.

The first portion 38 is fluidly coupled to heat exchanger bore 24 through a first valve seat 44. Disposed between the first portion 38 and the second portion 40 is a second valve seat 46. After assembly, the bypass valve 18 is bolted through the mounting bore 48 to the body of the oil supplying unit (not shown). Both the input port 26 and the return output port 34 are directly fastened to output ports of the oil supplying unit (not shown). Each port 26 and 34 have a port flange 52 which facilitates the coupling of the housing 20 to the output and input ports oil supply. Disposed on the mounting surface 47 of the housing 20 is a pair of annular grooves 59 about the ports 26 and 34. These annular grooves 59 accept gaskets 50 which fluidly seal the ports 26 and 34.

The valve element 22 according to the first embodiment of the present invention includes a generally cylindrical thermal element 54. The thermal element 54 is constructed of a central member 56 and an exterior star flange 58. The star flange 58 axially and radially supports the position of the thermal element 54. The thermal element 54 further has a first valve bearing element 60 at the thermal element's distal end 61. The first valve bearing element 60 interacts with the first valve seat 44 in the housing 20. Disposed between the first valve bearing element 60 and the star flange 58 is a spring which generally biases the valve element 22 in its closed position.

The valve element 22 further has a second spring 64 disposed between the star flange 58 and an interior bearing surface 66 of a mounting member 68. The mounting member 68 is constructed of a base portion 70 having a hex cap 72. The base portion 70 defines a bore 74 with the interior bearing surface 66.

As previously indicated in the description of the prior art, the purpose of the bypass valve 18 is to receive heated fluid from a transmission or engine by means of input port 26 and to return the fluid through return output port 34 before the fluid is passed through a heat exchanger during warm-up periods such as when the oil temperature is at a temperature of 160° F., or less. When the oil fluid temperature exceeds 160° F., at least a portion of the oil is directed by the valve 18 to the cooler (not shown) by means of the heat exchanger bore 24 through heat exchanger output port 28. The cooled oil passes from the cooler (not shown) by means of return input port 32 to the valve 18 and back to the oil source by means of return output port 34. At temperatures above 180° F., essentially all of the oil is routed through the cooler (not shown). It should be understood that these temperatures are merely exemplary and are not critical to the operating limits.

Figure 3:
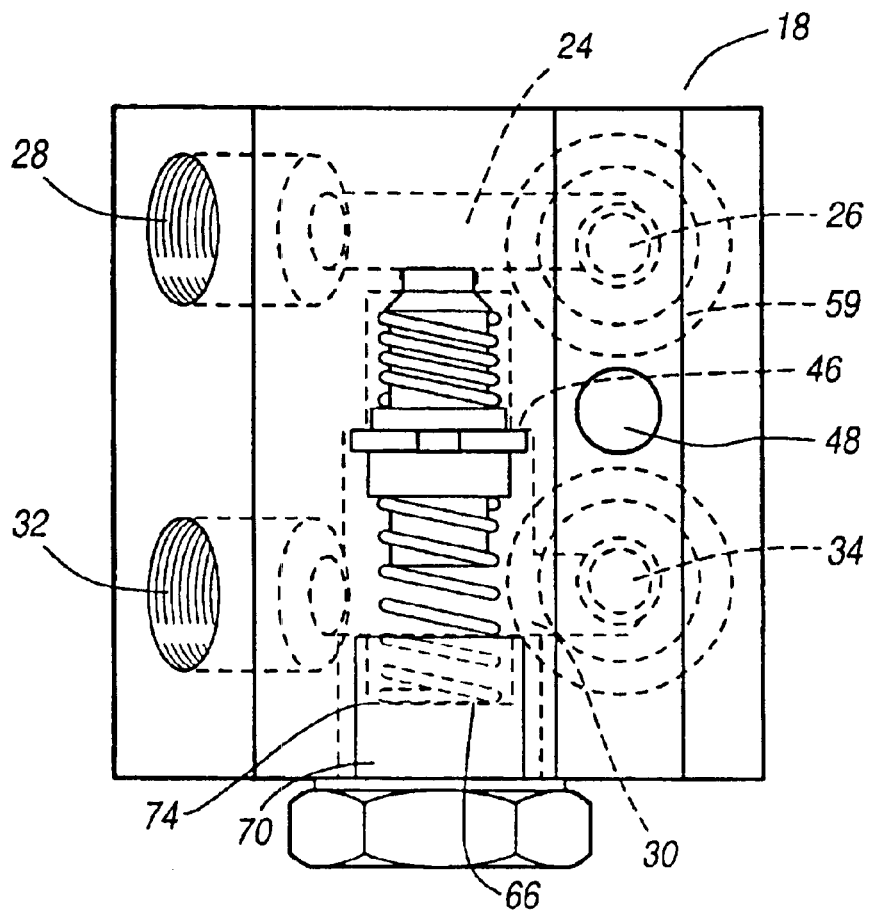
FIG. 3 is a top view of an assembled bypass valve in its closed position.
Figure 4:
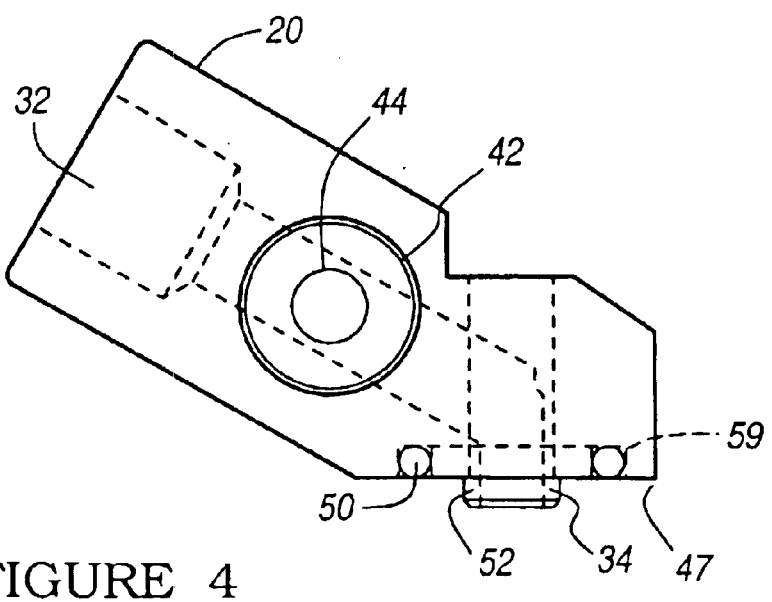
FIG. 4 is a side view of the valve housing of the present invention.

FIG. 3 depicts a top view of the valve assembly 18 according to the first embodiment of the present invention. Shown is the valve element 22 in its closed position. As can be seen, the first valve bearing element 60 is positioned so that the first valve seat 44 is closed. In this configuration, fluid will flow in through the input port, through the heat exchanger bore 24 and to the heat exchanger through heat exchanger output port 28. After cooling, the fluid will flow into the bypass valve through return input port 32 and to the oil source by return output port 34. The first and second springs 62 and 64 function to bias the valve in this position.

Figure 5:
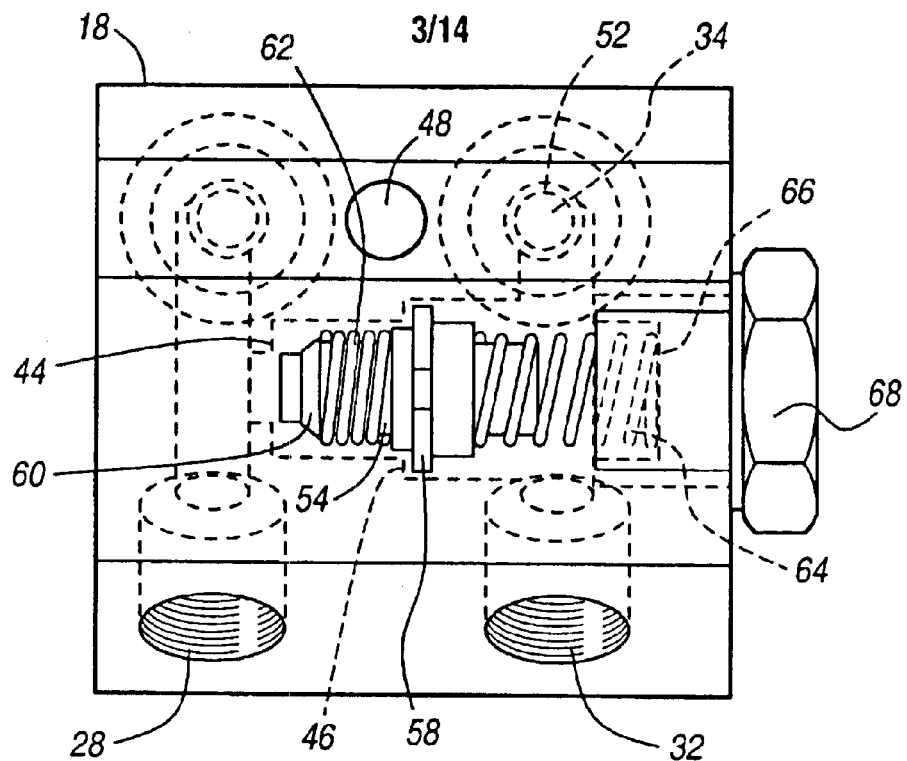
FIG. 5 is a top view of the valve assembly is an open warm-up position.
Figure 6:
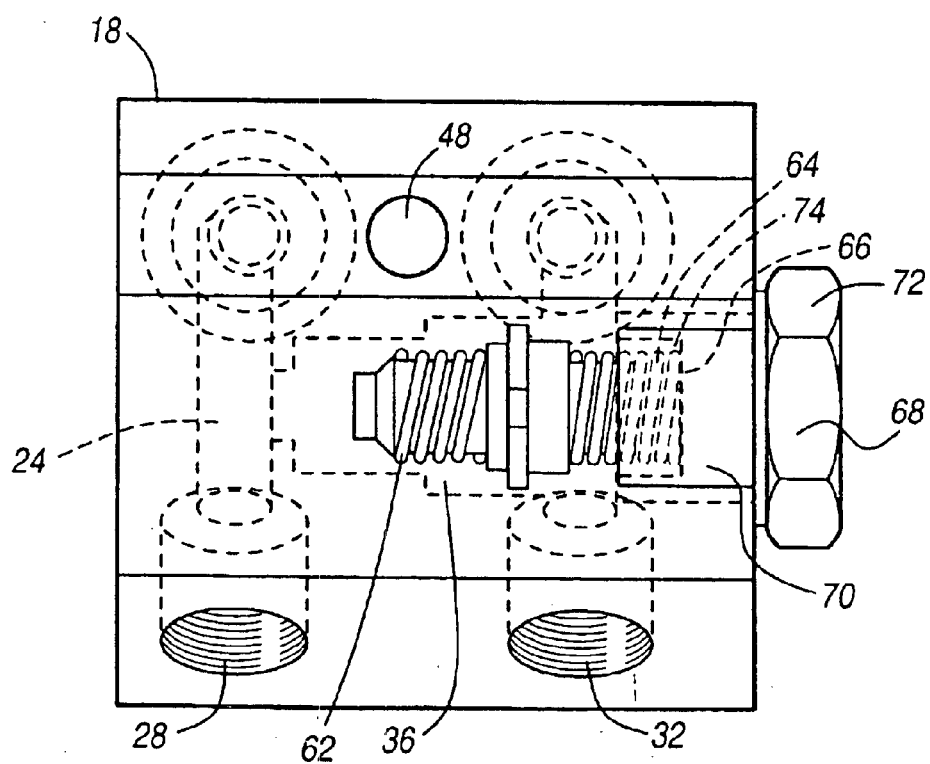
FIG. 6 is a top view of the valve assembly of valve 1 in its bypass position.

As can be seen in FIG. 5, when the thermal element 54 is lower than a temperature of approximately 180° F., the thermal element retracts the first valve bearing element 60 away from the first valve seat 44. Fluid is then allowed to pass through the notches in the star flange 58, along side the thermal element 54, through the bypass passage 36, and into the return bore 30. As previously mentioned, heat exchangers can plug, causing a malfunction in the cooling system. Rather than prevent flow of the engine oil, thus causing permanent damage to the engine, the valve assembly 18 of the present invention has an integral bypass function. As best can be seen in FIG. 6, upon the plugging of the oil cooler (not shown), the pressure and temperature of the fluid within heat exchanger bore 24 increases substantially. This increased pressure causes the second spring 64 to be compressed, thus allowing passage of fluid from the heat exchanger bore 24 through bypass passage 36 into return bore 30. This bypass feature forms a rapid warm-up system which contains a safety relief in the event of a catastrophic failure of any of the cooling system components.

Figure 7:
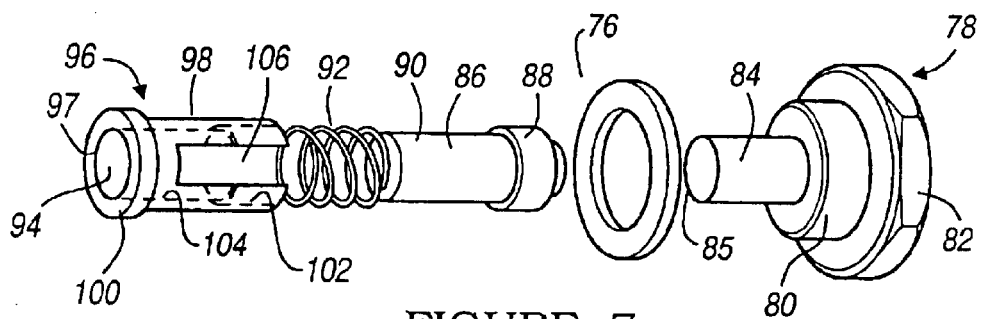
FIGS. 7 and 7a are an exploded view of the valve elements of a second embodiment of the present invention.

FIG. 7 represents an exploded view of a valve element 76 according to a second embodiment of the present invention. Shown is a mounting member 78 having a base 80 and a hexagonal endcap 82. The mounting member 78 further has an axially disposed engagement member 84. Engaged to the bearing surface 85 of the engagement member 84 is the thermal unit 86. The thermal unit is generally cylindrical having an annular flange 88 disposed on its outer surface 90. Further disposed about the outer surface 90 is a first helical spring 92. The thermal unit is slid into a through bore 94 of a sliding valve element 96.

The sliding valve element 96 is generally cylindrical having an exterior surface 98 having a first diameter. Disposed on the distal end 97 of the sliding valve member 96 is an annular ring 100 which has a diameter greater than the first radius of the exterior surface 98. The annular ring 100 functions to couple to interior surface 101 of bypass passage 36.

Figure 7A:
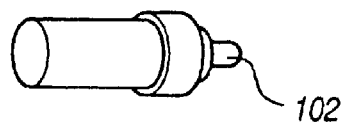

FIG. 7a depicts a thermal unit 86 in its engaged position. When the thermal unit 86 reaches a predetermined temperature, for example 180° F., it deploys a first piston member 102. Deployment of piston 102 functions to move the thermal unit 86 within the bypass passage 36 with respect to the outer elements of valve element 76.

Figure 8:
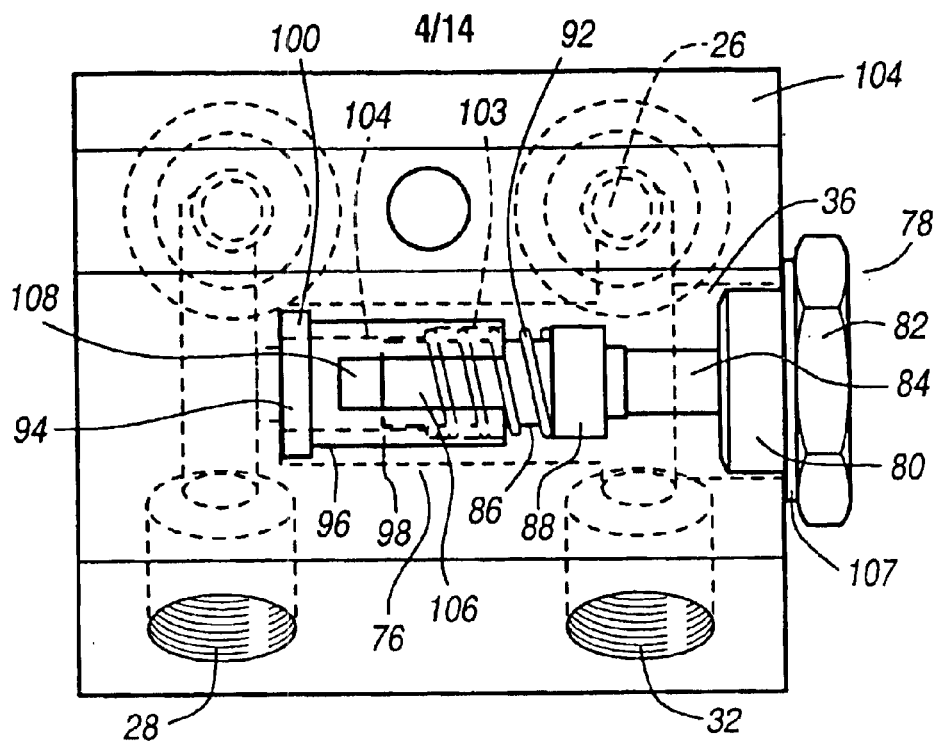
FIG. 8 is a view of an assembled valve assembly using the valve elements according to the second embodiment of the present invention in their open position.
Figure 9:
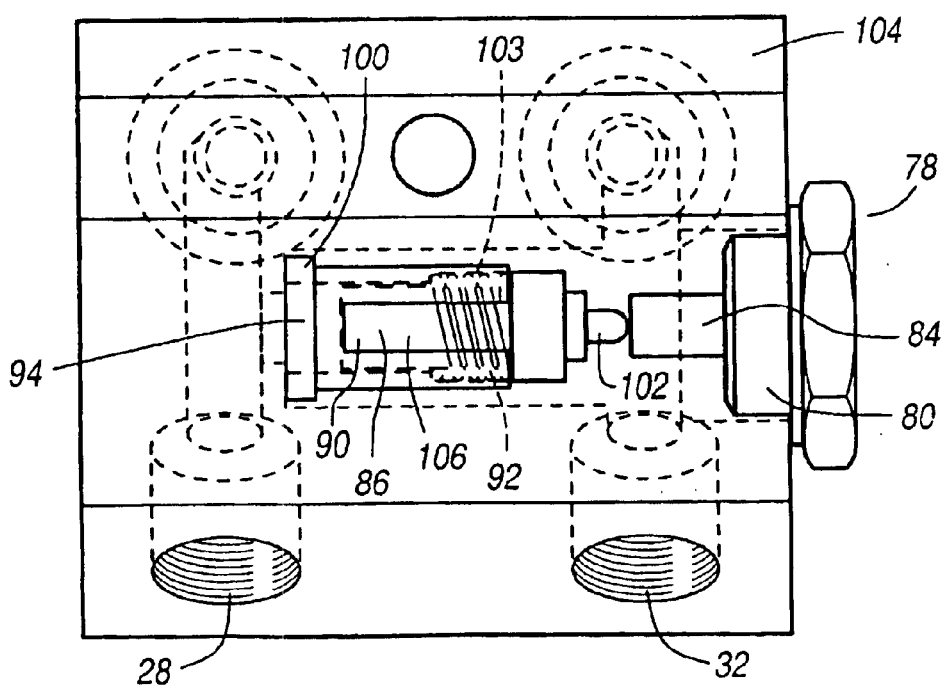
FIG. 9 is a top view of a valve assembly utilizing the valve elements according to the second embodiment of the present invention in its closed position.

FIG. 8 depicts the valve element 76 shown in FIG. 7 assembled into valve housing 104. Mounting member 78 functions to sealably enclose the elements of valve element 76 within bypass passage 36. As can be seen, the exterior surface 90 of thermal unit 86 is disposed within the first helical spring 92. A portion of the first helical spring 92 is disposed within a first portion 103 of through bore 94. First helical spring 92 is coupled against annular flange 88 of the thermal unit 86. As can be seen, when the thermal unit 86 is below about 180° F., a flow passage 108 is opened in the slot 106. As shown, fluid is allowed flow from input port 26 through the bypass passage 36 through output port 32.

When the thermal unit 86 reaches a temperature of about 180° F., the first piston 102 is deployed and engages against a surface of engagement member 84. This forces the body of thermal unit 86 further into the through bore 94 closing off the flow passage 108. Although a slot 106 is shown, flow passage 108 can take the form of a hole formed through the exterior surface 98 of the sliding valve element 96 into the through bore 94. Once the temperature of the oil drops below about 180° F., the piston 102 compresses first helical spring 92 and forces the thermal member toward the mounting member 78 re-opening flow passage 108. This again allows fluid to flow from input port 26 to output port 32 through bypass passage 36.

Figure 10:
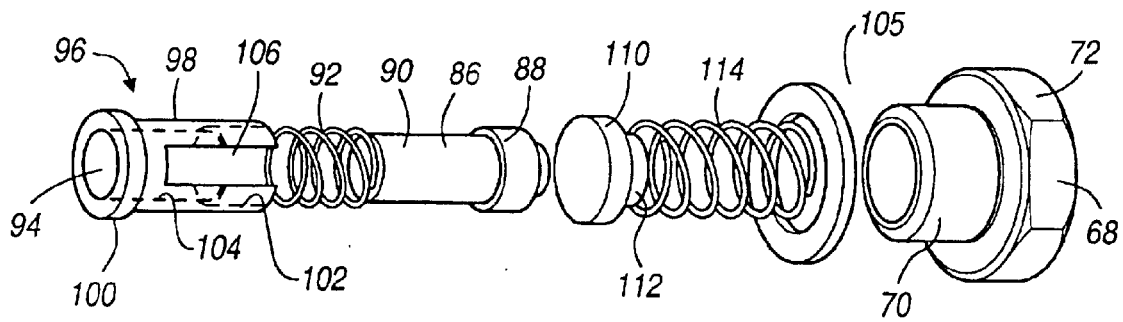
FIGS. 10 and 10a are exploded views of the valve elements according to a third embodiment of the present invention.
Figure 10A:
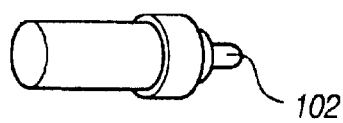

FIG. 10 discloses an exploded view of a valve assembly 105 according to the third embodiment of the present invention. The third embodiment has the sliding valve element 96, intermediate first helical spring 92, and thermal element 86. Additionally, the valve assembly 105 of the third embodiment has an intermediate bearing member 110. The intermediate bearing member 110 has a cylindrical portion 112 which allows it to couple to a second helical spring 114. The second helical spring 114 is mounted within the base portion 70 of the mounting member 78. FIG. 10a depicts the thermal unit having a deployed piston member 102 as is also shown in FIG. 7a.

Figure 11:
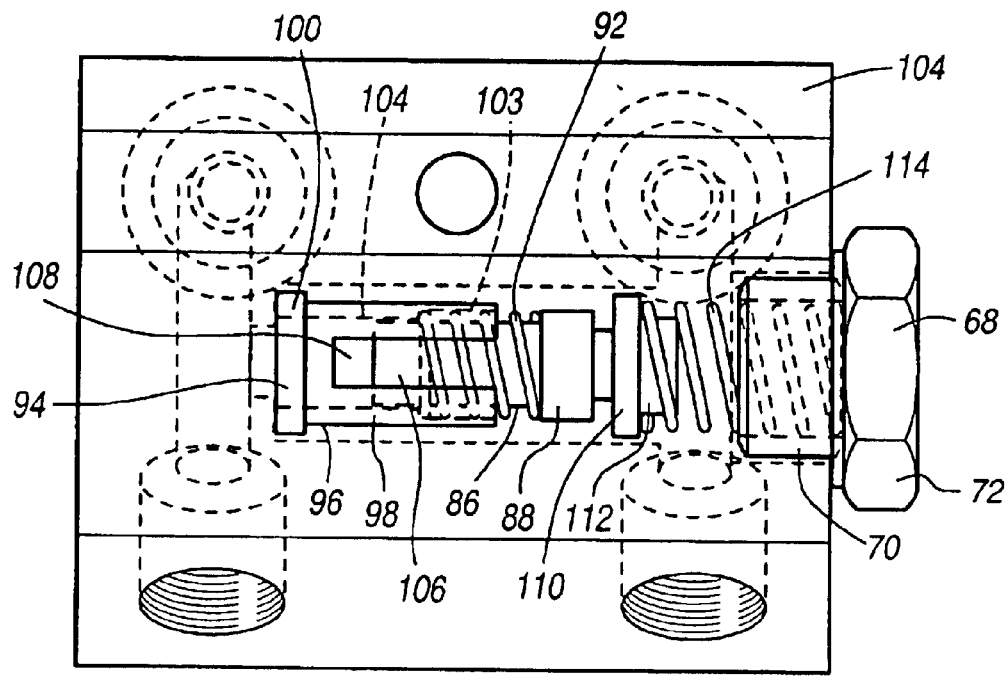
FIG. 11 is a top view of a valve utilizing the valve elements according to the third embodiment of the present invention in its opened position.
Figure 12:
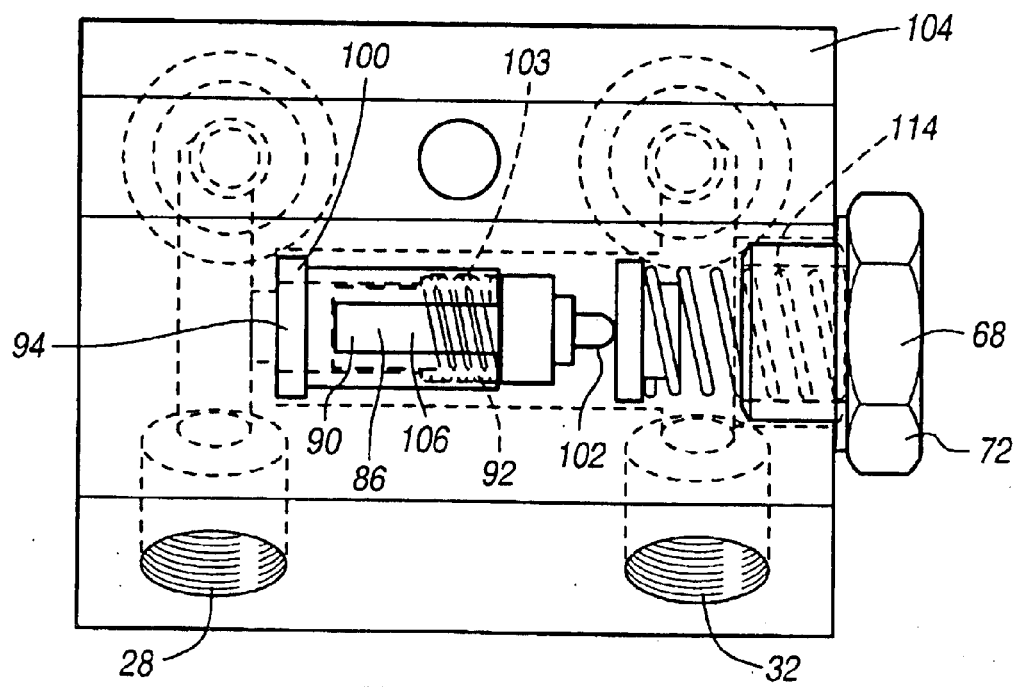
FIG. 12 is a top view of a valve in its closed position utilizing the valve elements of the third embodiment of the present invention.
Figure 13:
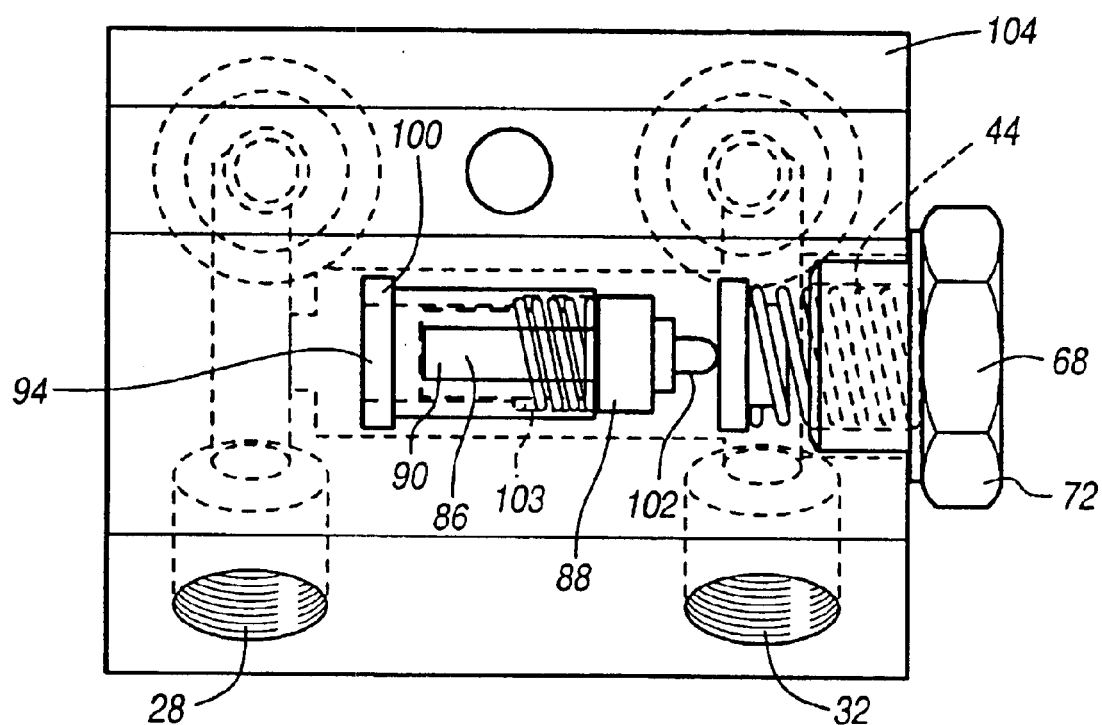
FIG. 13 is a top view of a valve utilizing the valve elements of the third embodiment of the present invention in its bypass mode.
Figure 14:
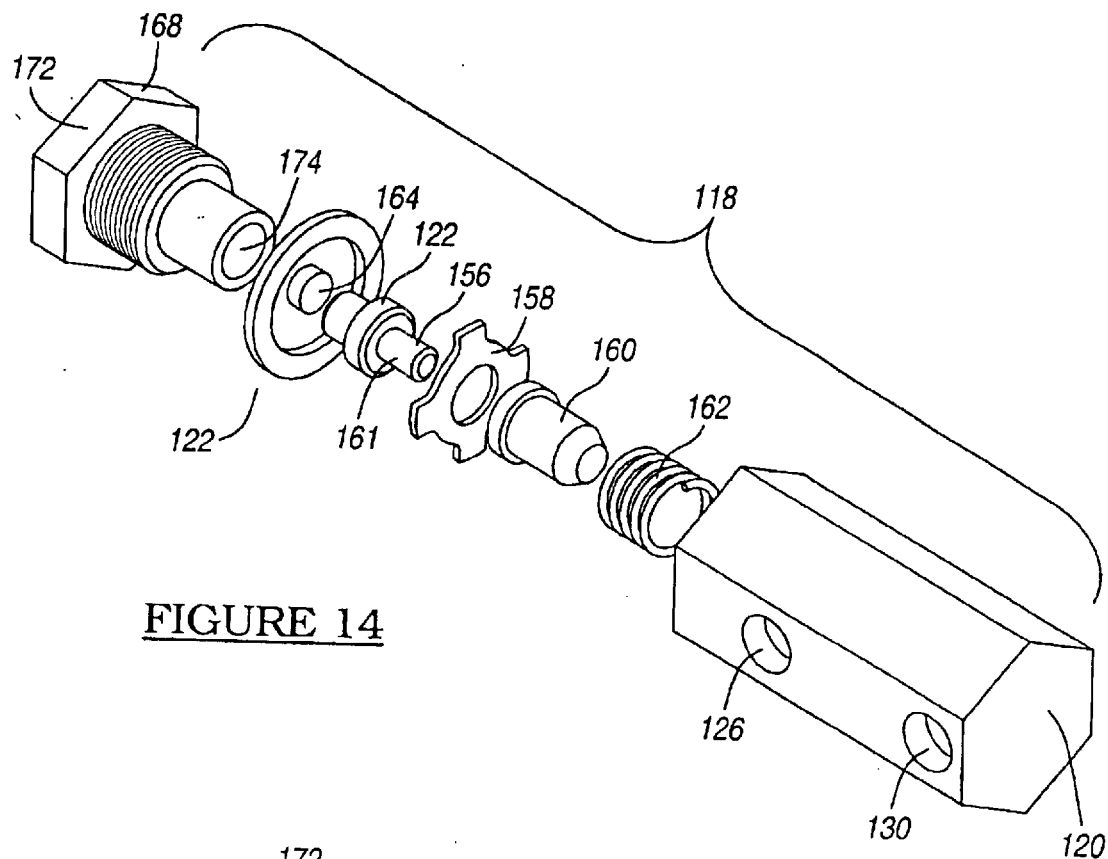
FIGS. 14 and 15 depict perspective views of another embodiment of the present invention.
Figure 15:
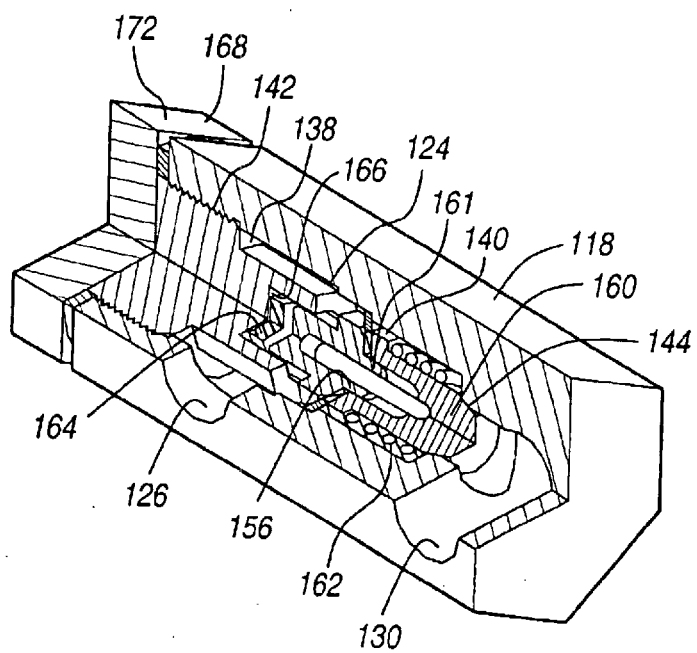

Generally, with reference to FIGS. 11–13, shown is valve assembly 105 according to the third embodiment of the present invention. Depicted in FIG. 11 is the valve assembly 105 shown in its open position. Depicted is the sliding valve member 96 disposed about the exterior surface 90 of thermal member 86. Disposed between the thermal member 86 and the sliding valve member 96 is a first helical spring 92. The first helical spring functions to bias the thermal member 86 into a generally opened position allowing fluid to flow through the bypass passage 36 through flow passage 108. Intermediate bearing member 110 and a second helical spring 114 are configured to allow the proper relationship of these components.

Upon reaching an elevated temperature such as 180° F., piston member 102 is deployed from thermal unit 86. In doing so, thermal unit 86 is forced further into through bore 94 compressing first helical spring 92, and thus closing flow passage 108. The closing of port 108 is similar to that shown in embodiment two.

Should a situation occur when there is a malfunction of the cooling system, such as a blockage, a second helical spring 114 compresses under the pressure of the heated oil to allow fluid to flow around annular flange 100 of the sliding base member 96. It should be noted that typically, when there is a blockage in the cooling system, the temperature of the fluid to be cooled quickly rises. This causes the piston 102 of thermal element 86 to be extended, normally closing off the flow of fluid through bypass passage 36. By providing a thermal, as well as pressure bypass system, overall cooling system safety can be ensured.

Referring now to FIGS. 14–18, there is illustrated a fluid cooler bypass valve 118 which can be connected to a transmission, engine or power steering fluid pump. The valve 118 is primarily formed by a valve body 120 and valve element 122. The valve body 120 defines a heat exchanger bore 124 having an input port 126 and a heat exchanger output port 128. The valve body 120 further defines a fluid return bore 130 having a return input port 132 and a return output port 134. Disposed between the heat exchanger bore 124 and the return bore 130 is a bypass passage 136. The bypass passage 136 is configured to accept the valve element 122. The bypass passage 136 has a first portion 138 having a first diameter and a second portion 140 having a second diameter which is greater than the first diameter. A threaded portion 142 facilitates the coupling of the valve element 122 to the valve body 120.

The first portion 138 is fluidly coupled to heat exchanger bore 124 through a first valve seat 144. After assembly, the bypass valve 118 is bolted to the valve body 120 of the oil supplying unit (not shown). Both the input port 126 and the return output port 134 are directly fastened to output ports of the oil supplying unit (not shown). Each port 126 and 134 have couplings 152 which facilitate the coupling of the valve body 120 to the output and input ports oil supply.

The valve element 122 according to the first embodiment of the present invention includes a generally cylindrical thermal element 154. The thermal element 154 is constructed of a central member 156 and an exterior star washer 158. The star washer 158 axially and radially supports the position of the thermal element 154. Coupled to the thermal element 154 is a first valve bearing element 160 at the thermal element's distal end 161. The first valve bearing element 160 interacts with the first valve seat 144 in the valve body 120. Disposed between a radial flange on the first valve bearing element 160 and the first valve seat 144 is a spring which generally biases the first bearing element 160 in its opened position.

The first bearing element 160 further has an elastic member 164 disposed between the thermal element 154 and an interior bearing surface 166 of a mounting member 168. The mounting member 168 is constructed of a base portion 170 having a hex cap 172. The base portion 170 defines a bore 174 with the interior bearing surface 166. The elastic member 164 functions to allow proper tolerance stackup during assembly of the valve, but can also function as compressible oil pressure override should the system pressure get too high.

As previously indicated in the description of the prior art, the purpose of the bypass valve 118 is to receive heated fluid from a transmission or engine by means of input port 126 and to return the fluid through return output port 134 before the fluid is passed through a heat exchanger during warm-up periods such as when the oil temperature is at a temperature of 160° F., or less. When the oil fluid temperature exceeds 160° F., at least a portion of the oil is directed by the valve 118 to the cooler (not shown) by means of the heat exchanger bore 124 through heat exchanger output port 128. The cooled oil passes from the cooler (not shown) by means of return input port 132 to the valve 118 and back to the oil source by means of return output port 134. At temperatures above 180° F., essentially all of the oil is routed through the cooler (not shown). It should be understood that these temperatures are merely exemplary and are not critical to the operating limits.

Figure 16:
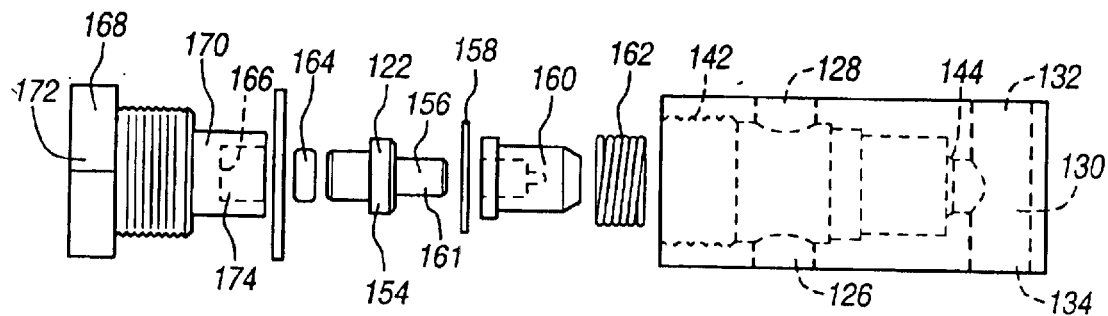
FIGS. 16–18 depict cross-sectional views of the bypass valve depicted in FIG. 15.
Figure 17:
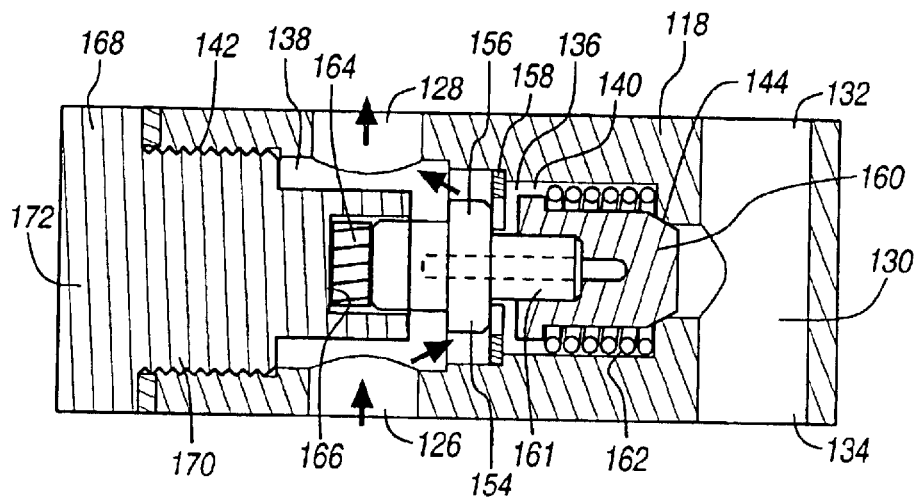
Figure 18:
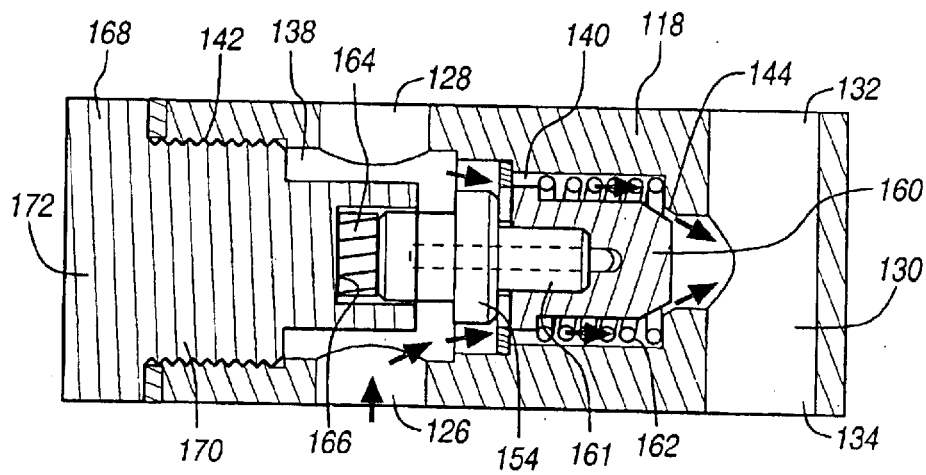

FIGS. 16–18 depict side views of the valve assembly 118. Shown is the valve element 122 in its closed position. As can be seen, the first valve bearing element 160 is positioned so that the first valve seat 144 is closed. In this configuration, fluid will flow in through the input port, through the heat exchanger bore 124 and to the heat exchanger through heat exchanger output port 128. After cooling, the fluid will flow into the bypass valve through return input port 132 and to the oil source by return output port 134. The spring 162 functions to bias the valve in this position.

As can be seen in FIG. 18, when the thermal element 154 is a temperature less than approximately 180°, the thermal element retracts the first valve bearing element 160 away from the first valve seat 144. Fluid is then allowed to pass through the notches in the star flange 158, along side the thermal element 154, through the bypass passage 136, and into the return bore 130. Alternatively, the input and outputs can be exchanged. In this instance, as previously mentioned, heat exchangers can plug, causing a malfunction in the cooling system. Rather than prevent flow of the engine oil, thus causing permanent damage to the engine, the valve assembly 118 of the present invention has an integral bypass function. Upon the plugging of the oil cooler (not shown), the pressure and temperature of the fluid within heat exchanger bore 124 increases substantially. Optionally, this increased pressure causes the elastic element 164 to be compressed, thus allowing passage of fluid from the heat exchanger bore 124 through bypass passage 136 into return bore 130. This bypass feature forms a rapid warm-up system which contains a safety relief in the event of a catastrophic failure of any of the cooling system components.

Figure 19:
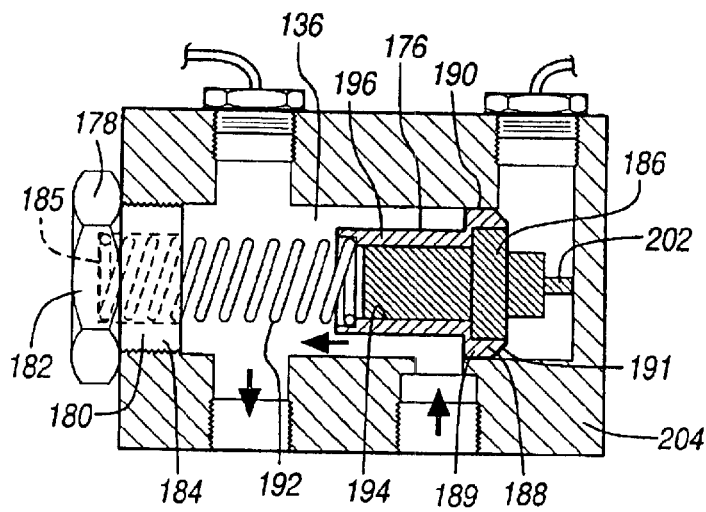
FIGS. 19–21 depict cross-sectional views of another embodiment according to the teachings of the present invention.
Figure 20:
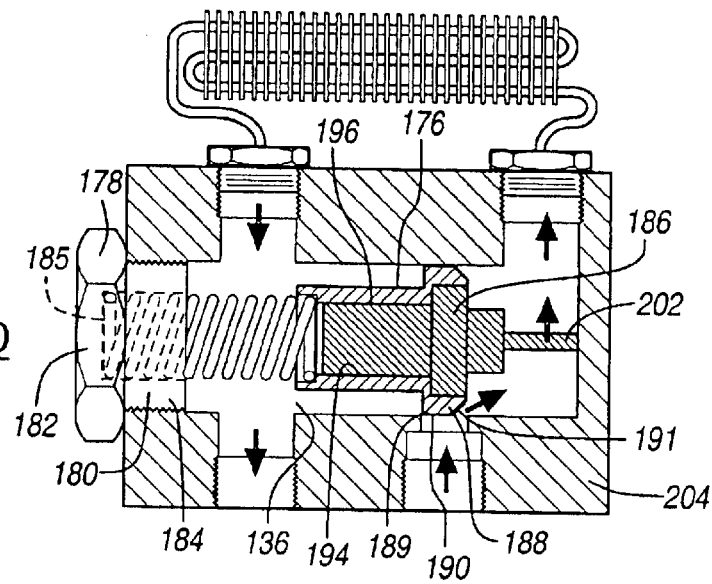
Figure 21:
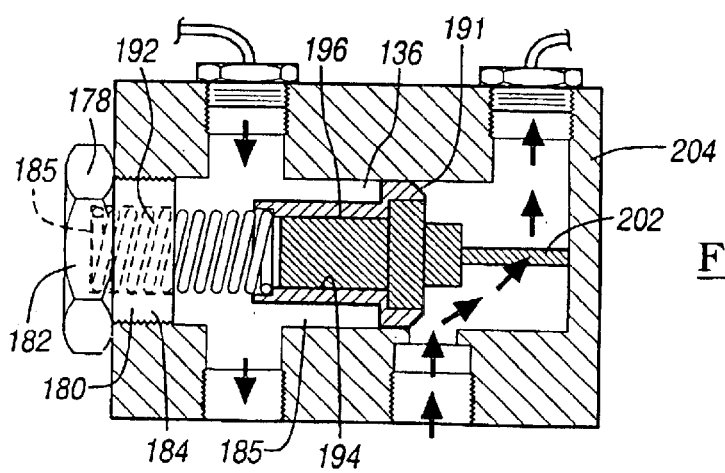

FIGS. 19–21 represent a cross-sectional view of a valve 176 according to another embodiment of the present invention. Shown is a mounting member 178 having a base 180 and a hexagonal endcap 182. The mounting member 178 further has an axially disposed engagement member 184. Engaged to the bearing surface 185 of the engagement member 184 is a first helical spring 192 and a thermal unit 186. The thermal unit 186 is generally cylindrical having an annular flange 188 which forms a metering surface 189 disposed on its outer surface 190. The thermal unit 186 is slid into a through bore 194 of a sliding valve element 196.

FIG. 19 depicts a thermal unit 186 in its bypass position. When the thermal unit 186 reaches a predetermined temperature, for example 180° F., it deploys a first piston member 202. Deployment of piston 202 functions to move the thermal unit 186 within the bypass passage 136 with respect to the outer elements of valve element 176.

FIG. 20 depicts the valve element 176 shown in FIG. 19 assembled into valve housing 204. Mounting member 178 functions to sealably enclose the valve element 176 within bypass passage 136. As can be seen, the metering surface 189 of thermal unit 186 is disposed adjacent the input port. The metering surface 189 defines a bevel 191 which prevents a total closure of the input port, which has a cross-sectional area larger than the area of the metering surface. Thus, the metering surface partially obscures the input port. First helical spring 192 is coupled against annular flange 188 of the thermal unit 186. As can be seen, when the thermal unit 186 is above about 180° F., oil flows past the bevel 191 of metering surface 189 into the cooler. As shown, fluid is allowed flow from input port 126 through the cooler and through output port 132.

When the thermal unit 186 reaches a temperature above about 180° F., the first piston 202 is fully deployed and engages against a surface of engagement member 184. This forces the body of thermal unit 186 further into the through bore 194 closing off the flow passage 208. Once the temperature of the oil drops below about 180° F., the piston 202 is compressed by first helical spring 192 and forces the thermal member 186 to reopen flow passage 208.

FIG. 21 depicts an optional bypass notch 185. Should the head exchanger plug, pressure increases force the compression of the helical spring 192. The pressurized oil will then pass the bevel 191 on the metering surface 189 and travel through the flow passage 208.

Figure 22:
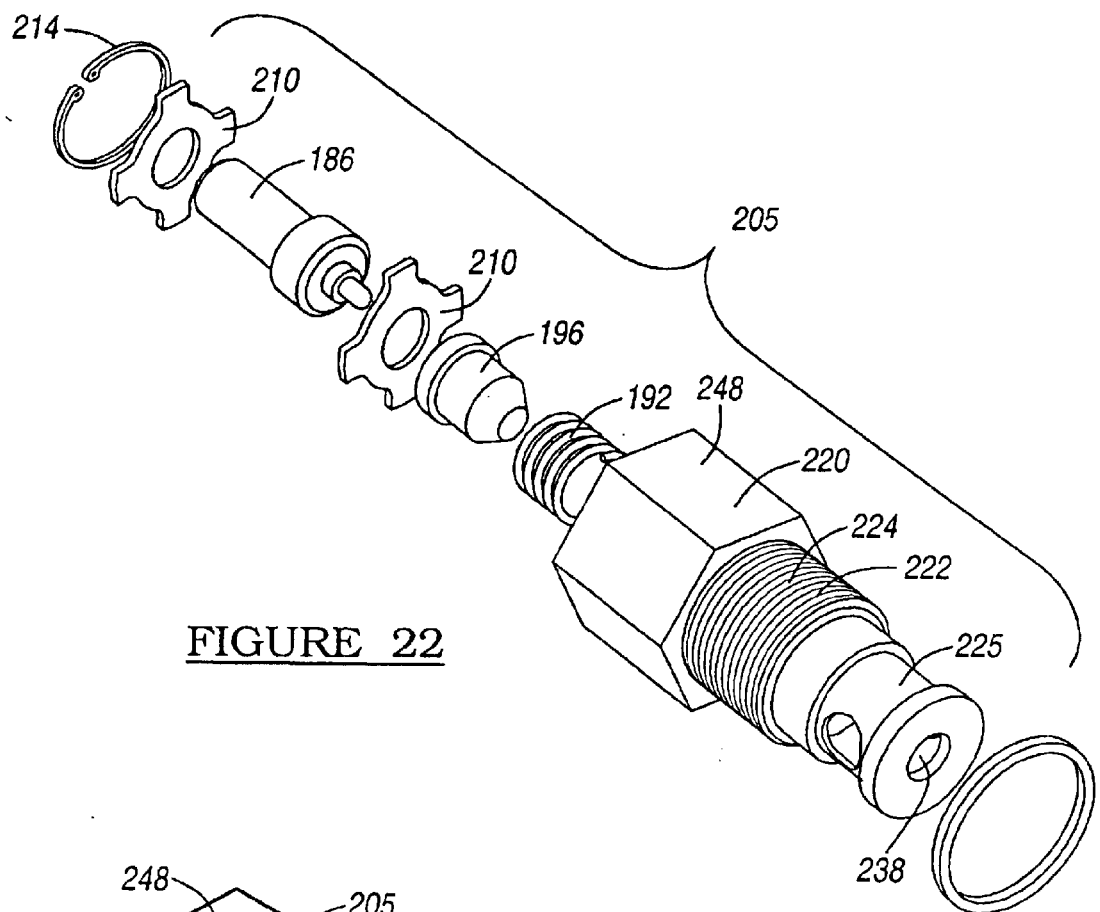
FIGS. 22 and 23 depict a perspective view of another bypass valve according to the teachings of the present invention.
Figure 23:
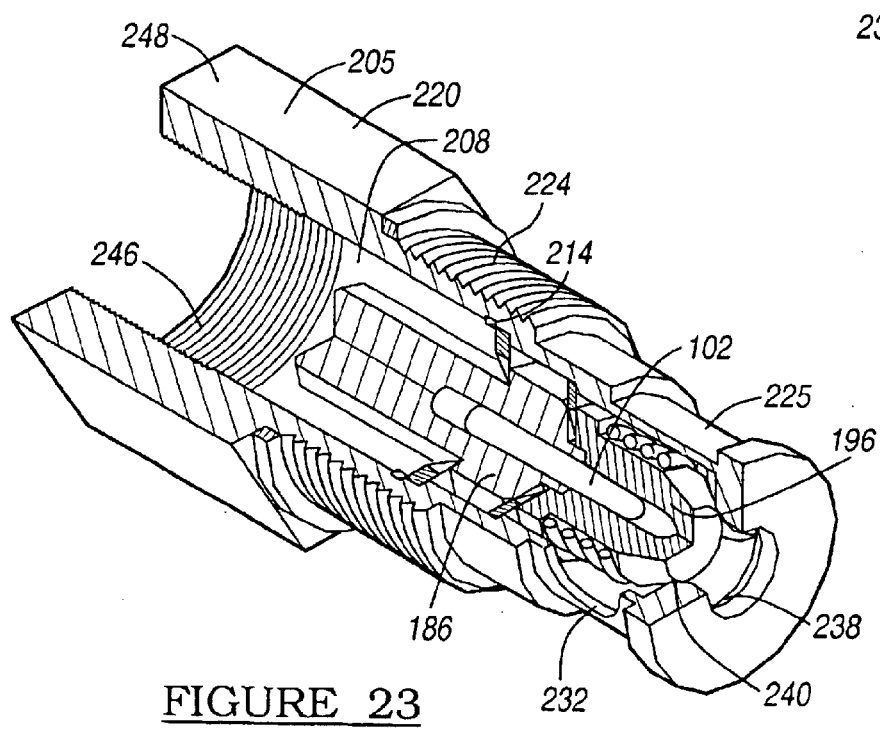
Figure 24:
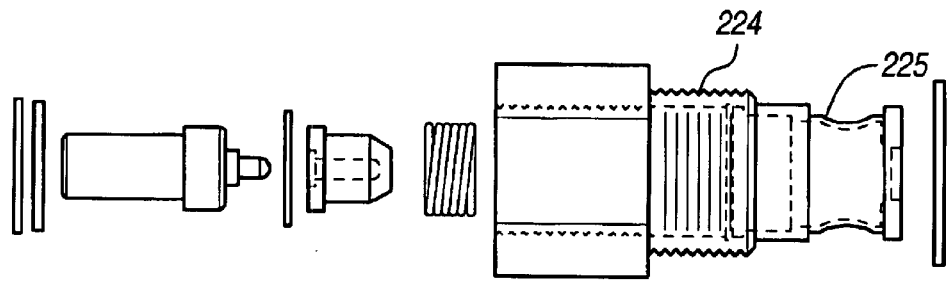
FIGS. 24–26 depict cross-sectional views of the bypass valve depicted in FIG. 23.

FIG. 22 discloses an exploded view of a valve assembly 205 according to another embodiment of the present invention. The valve assembly has the sliding valve element 196, intermediate first helical spring 192, and thermal element 186. Additionally, the valve assembly 205 of the third embodiment has a pair of star washers 210. The star washers 210 are coupled into the valve body 220 by a snap ring 214. The snap ring 214 is mounted within a groove defined in the flow passage 208.

The valve body 220 is cylindrical and has a first portion 222 which has a threaded outer surface 224 and a second portion 225 which has a diameter smaller than the first portion 222. The threaded outer surface 224 is configured to be mated with a threaded bore 226 defined in a transmission case 228. Fluidly coupled to the bore 226 is at least one oil cooler supply line 230. The second portion 225 is configured to be positioned adjacent to the fluid supply lines 230 to allow oil to fill the cavity formed between the second portion 225 and the bore 226 of transmission case 228.

Defined within the second portion 225 is at least one orifice 232 for bringing oil into the bypass valve assembly 205. The orifice 232 fluidly couples the cavity 231 to a flow passage 234 defined within the valve body 220. Defined on a distal end 236 of the valve body 220 is a bypass orifice 238 which returns oil back to the transmission. The bypass orifice 238 defines a valve seat 240 which mates with the valve element 196.

Figure 25:
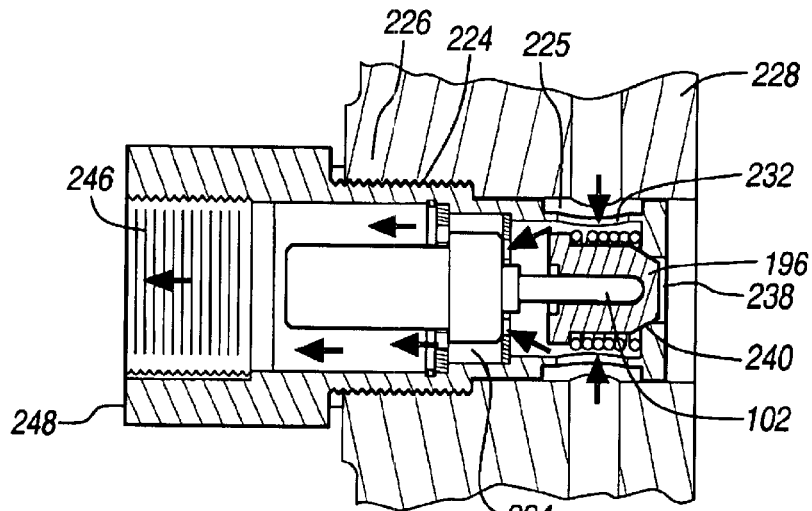

As best seen in FIG. 25, when the temperature of the oil is above about 180° F., the thermal element 186 actuates a piston 102, forcing the valve element 196 into the valve seat 240. This allows the coolant to pass through the flow passage 234 to a heat exchanger (not shown). Oil flowing through the heat exchanger returns to the transmission case at a location remote from the valve body. It should be noted that the flow passage 234 defines a coupling 246 at a proximal end 248 of the body 220 for fluidly coupling the valve body 220 to the heat exchanger.

Figure 26:
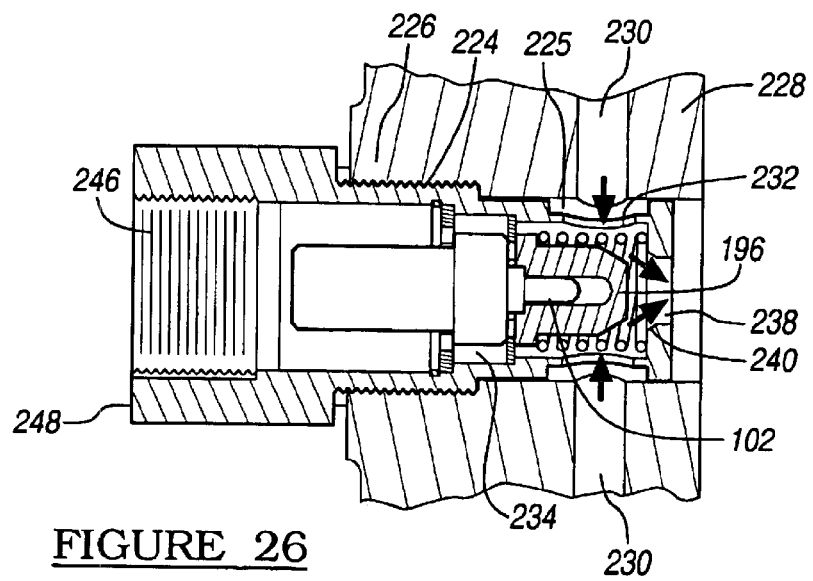

As best seen in FIG. 26, when the temperature is below about 160° F., the thermal element 196 retracts its piston, which moves the sliding valve element 196 away from the valve seat 240. Oil then bypasses the heat exchanger and immediately returns to the transmission case 228 via the bypass orifice 238.

Figure 27:
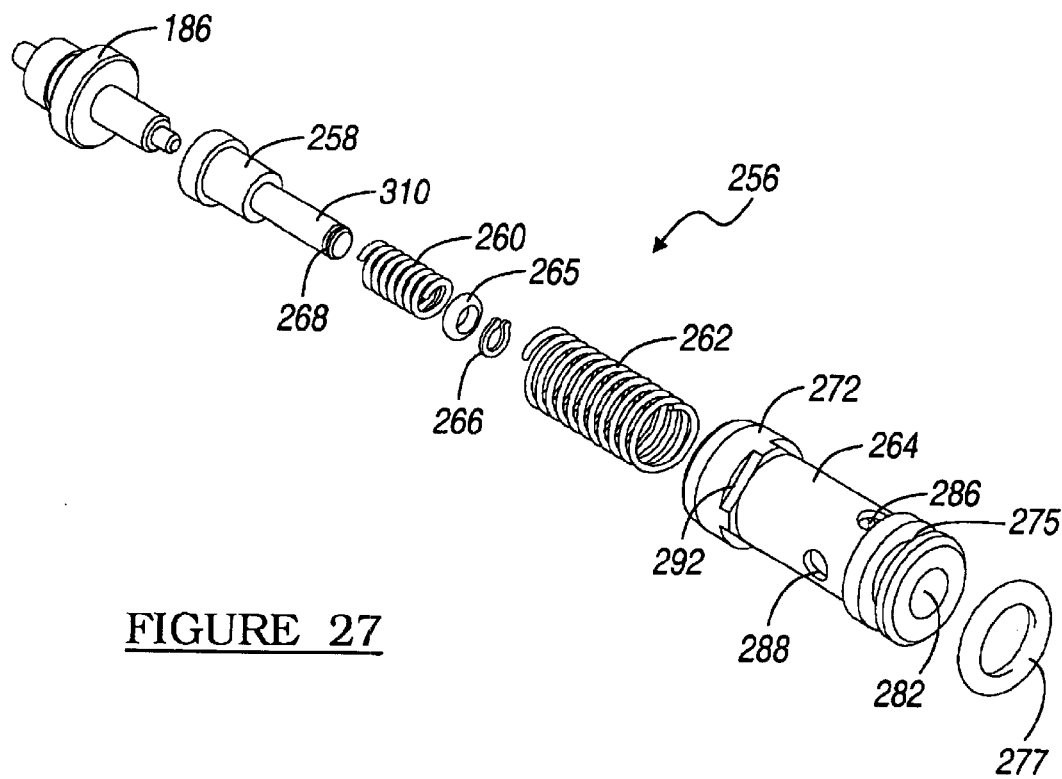
FIGS. 27 depict a perspective view of another bypass valve according to the teachings of the present invention.

FIG. 27 discloses an exploded view of a valve assembly 256 according to another embodiment of the present invention. The valve assembly has the sliding valve element 258, first and second intermediate helical springs 260 and 262, thermal element 186 and valve seal 265. Additionally, the valve assembly 256 has a valve body 264 which is configured to encase the afore mentioned components. A snap ring 266, which functions as a valve seal stop, is mounted within a groove 268 defined on the sliding valve element 258.

The valve body 264 is cylindrical and is configured to be disposed within an aperture 270 formed within a structure 272. In this regard, the valve body 264 has outer surface 274 is configured to be frictionally engaged with the interior surface 276 of the aperture 270. A notch 275 formed on the outer surface 274 which is configured to hold an O-ring 277 that fluidly seals and couples the valve body outer surface 274 within the aperture 270. Additionally the valve body 264 defined a through bore 278. Fluidly coupled to the bore 278 is at least one oil cooler supply line 230 which is fluidly coupled to an oil cooler (not shown). The valve body 264 is configured to be positioned adjacent to the fluid supply lines 230 to allow oil to bypass the oil cooler and flow through the valve assembly 256 to the fluid return 280.

Defined within a first portion 281 of the valve body 264 is at least one orifice 282 for bringing oil into the bypass valve assembly 256. The orifice 282 fluidly couples the oil cooler supply line 230 to a flow passage 284 defined within the valve body 264. Defined on the outer surface 274 of distal end 286 of the valve body 264 is a bypass orifices or slots 288 which fluidly couples the flow passage 284 to a cavity 290 formed by the outer surface 274 of the valve body 264 and the aperture 270. The cavity 290 is fluidly coupled to the fluid return line through slots 292 defined in the outer surface of the valve body 264. Although slots are shown, it is envisioned that a star washer can be used to retain the valve body and allow the flow of the bypass oil. As further described below, the bypass orifice 282 defines an outer spring bearing surface 283 and a valve seat 294 which mates with the valve element 262.

Figure 28:
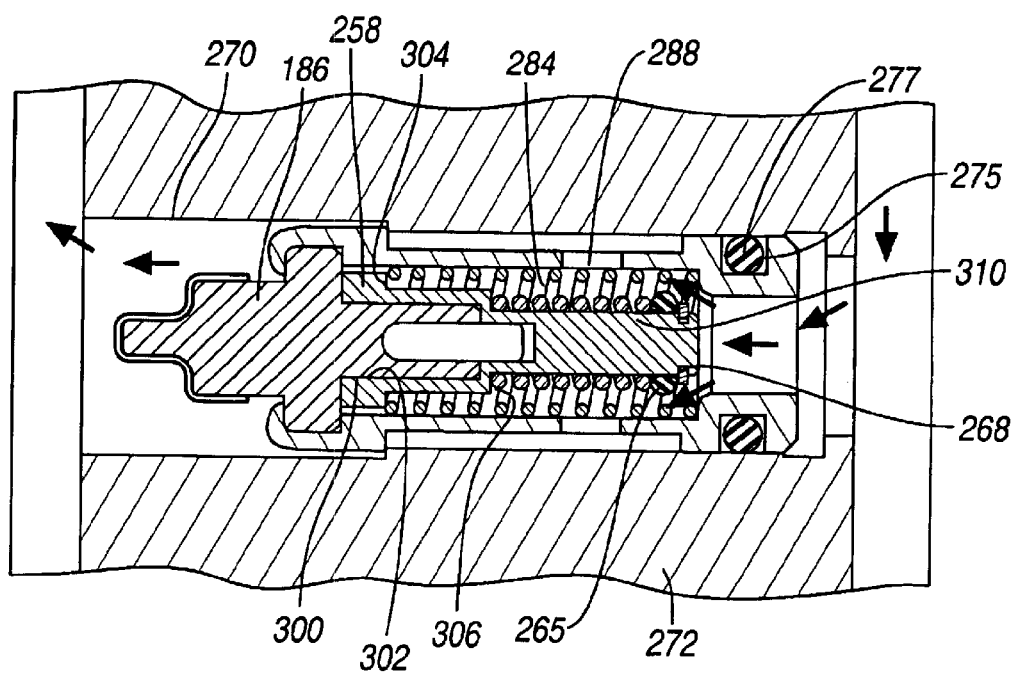
FIGS. 28–30 depict cross-sectional views of the bypass valve depicted in FIG. 27.

As best seen in FIG. 28, the thermal element 186 is fixably coupled to an interior surface of the through passage valve body 264. The thermal element 186 has an exterior cylindrical bearing surface 300 which is used to slidably support an interior bearing surface 302 defined in the sliding valve element 258. As previously described, the thermal element 186 has an actuatable piston which actuates or retracts as the temperature of the thermal element increases or decreases. This actuatable piston is configured to apply force onto an interior surface of the sliding valve element 258.

The sliding valve element 258 has a first outer bearing surface 304 which is configured to engage a first end of the second intermediate spring 262. The sliding valve element 250 further has a second exterior bearing surface 306 which is configured to engage a first end 308 of the second intermediate spring. Disposed adjacent to the second exterior bearing surface 300 is a cylindrical valve element bearing surface 310. The cylindrical valve element bearing surface 310 slidably supports the valve seal 265 and regulates the movement of the valve seal 265 toward and away from the valve seat 294. The valve seal 265 is biased by the second intermediate spring toward the snap ring 266. The snap ring 266 functions to regulate the movement of the valve element 264 along the cylindrical valve element bearing surface 310. The first spring is annularly disposed about a portion of the sliding valve element 258. The first spring is configured to bias the sliding valve element 258 away from the bearing seat 294.

When the temperature is below about 160° F., the thermal element 186 retracts its piston, which allows the sliding valve element 262 away from the valve seat 294. Oil then bypasses the heat exchanger by passing through the flow passage 284 and though the cavity 290 formed by the outer surface 274 of the valve body 264 and the aperture 270. The bypass fluid then pass through the slots 292 defined in the outer surface of the valve body 264 the and immediately returns to the transmission case 228 via the return line 280.

Figure 29:
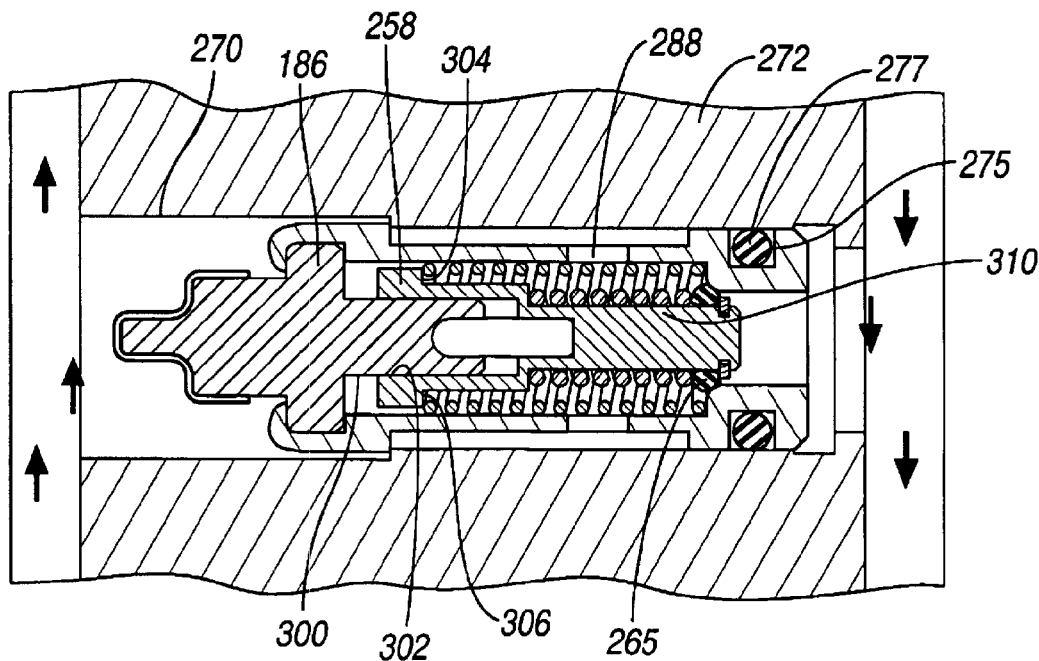

As best seen in FIG. 29, when the temperature of the oil is above about 180° F., the thermal element 186 actuates a piston, forcing the sliding valve element 258 and seal 265 into the valve seat 294. As shown, the snap ring 266 is positioned within the orifice 282 in such a way to allow the engagement of the valve element with the valve seat. This allows the coolant to pass the bypass passage and flow through a heat exchanger (not shown). Oil flowing through the heat exchanger returns to the transmission case at a location remote from the valve body. It should be noted that the flow passage 234 defines a coupling 246 at a proximal end 248 of the body 220 for fluidly coupling the valve body 220 to the heat exchanger.

Figure 30:
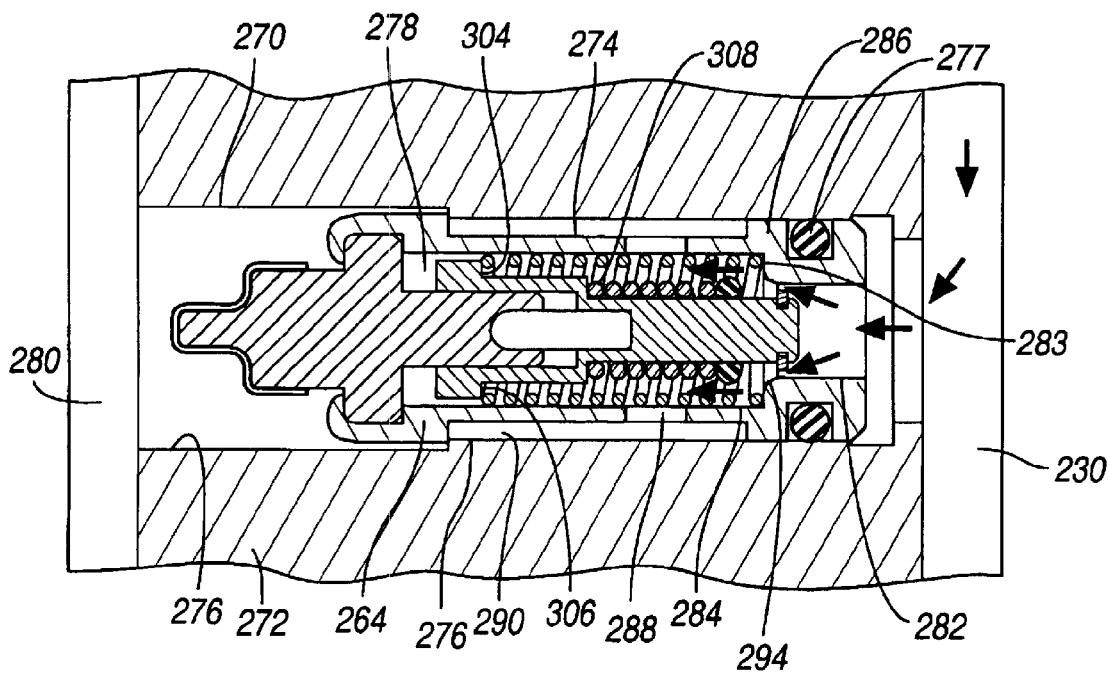

As best seen in FIG. 30, when the temperature of the oil is above about 180° F. and the pressure is above a predetermined level from an oil cooler blockage, the valve seal 265 is forced by the increased oil pressure away from the valve seat 294. The valve element slides along valve element bearing surface away from the snap ring. This allows the oil to pass through the bypass valve and to bypass the heat exchanger (not shown). Oil flowing through the bypass valve 256 returns to the transmission case. It should be noted that the flow passage 234 defines a coupling 246 at a proximal end 248 of the body 220 for fluidly coupling the valve body 220 to the heat exchanger.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention.

What is claimed is:

1. A fluid bypass valve configured to be placed within a bypass passage defined by a component, the bypass valve comprising:
   a valve housing defining an elongated bypass passage having a first valve seat, said bypass passage communicating with a fluid supply and a fluid return;
   a thermally responsive actuator which moves the valve bearing element between an open and closed positions;
   a sliding valve element disposed within the valve housing;
   first and second intermediate helical springs annularly disposed about the sliding valve element;
   a valve seal which is engageable with the first valve seat having a closed position for preventing oil flow through the elongated bypass passage, and further having an open position for allowing bypass oil fluid from the fluid supply line back to the fluid return line; and
   wherein the first spring engaged between said sliding valve element and said valve housing and operative to urge said sliding valve element away said first valve seat and wherein the second spring is engaged between said sliding valve element and said valve seal and operative to urge said valve seal toward said valve seat.

2. The fluid bypass valve of claim 1 wherein said valve housing defines a bypass aperture, whereby said valve member is inserted into said bypass passage through said aperture.

3. The fluid bypass valve of claim 2 wherein said thermally responsive actuator is coupled to the valve housing.

4. The fluid bypass valve of claim 3 wherein said sliding valve element defined a valve seal stop.

5. The fluid bypass valve of claim 4 wherein said valve seal stop is a snap ring.

6. The fluid bypass valve of claim 1 wherein said sliding valve element has a first outer bearing surface which is configured to engage a first end of the first intermediate spring.

7. The fluid bypass valve of claim 1 wherein said sliding valve element has a second exterior bearing surface which is configured to engage a first end of the second intermediate spring.

8. The fluid bypass valve of claim 7 wherein said sliding valve element has a second exterior bearing surface is a cylindrical valve element bearing surface.

9. The fluid bypass valve of claim 8 wherein the sliding valve element bearing surface slidably supports the valve seal and regulates the movement of the valve seal toward and away from the valve seat.

10. The fluid bypass valve of claim 1 wherein said thermally responsive actuator comprises a retractable piston, said thermally responsive actuator is configured to retract said piston and thereby position the sliding valve element in an open position.

11. The fluid bypass valve of claim 10 wherein said valve housing defines an aperture, whereby said thermally responsive valve member is inserted into said bypass passage through said aperture.

12. The fluid bypass valve of claim 11 wherein said thermally responsive actuator comprises a retractable piston, said thermally responsive actuator is configured to retract said piston and thereby position a valve seal stop on the sliding valve element in an open position.

13. The fluid bypass valve of claim 1 wherein said an exterior surface of the valve housing and said aperture define a cavity fluidly coupled to the elongated through passage.

14. A fluid bypass valve configured to be placed within a bypass passage defined by a component, the bypass valve comprising:
  a valve housing defining an elongated bypass passage having a first valve seat, said bypass passage communicating with a fluid supply and a fluid return;
  a thermally responsive actuator which moves the valve bearing element between an open and closed positions;
  a sliding valve element disposed within the valve housing, said sliding valve element defined a valve seal stop and a first outer bearing surface which is configured to engage a first end of the first intermediate spring, said sliding valve element has a second exterior bearing surface which is configured to engage a first end of the second intermediate spring;
  first and second intermediate helical springs annularly disposed about the sliding valve element;
  a valve seal which is engageable with the first valve seat having a closed position for preventing oil flow through the elongated bypass passage, and further having an open position for allowing bypass oil fluid from the fluid supply line back to the fluid return line; and
  wherein the first spring is operably engaged between said sliding valve element and said valve housing and operative to urge said sliding valve element away said first valve seat and wherein the second spring is engaged between said sliding valve element and said valve seal and operative to urge said valve seal toward said valve seat.

15. The valve according to claim 14 wherein the thermally responsive element is disposed within the valve bearing element.

16. The valve according to claim 14 wherein the thermal element is fixably coupled to an interior surface of the through passage valve body.

17. A fluid bypass valve configured to be placed within a bypass passage defined by a component, the bypass valve comprising:
  a valve housing defining an elongated bypass passage having a first valve seat, said bypass passage communicating with a fluid supply and a fluid return;
  a thermally responsive actuator which moves the valve bearing element between an open and closed positions;
  a sliding valve element disposed within the valve housing, said sliding valve element defined a valve seal stop and a first outer bearing surface which is configured to engage a first end of a first intermediate spring, said sliding valve element has a second exterior bearing surface which is configured to engage a first end of a second intermediate spring, said first and second intermediate helical springs being annularly disposed about the sliding valve element; said sliding valve element defining a cylindrical valve element bearing surface which slidably supports a valve seal, the valve seal being engageable with the first valve seat having a closed position for preventing oil flow through the elongated bypass passage, and further having an open position for allowing bypass oil fluid from the fluid supply line back to the fluid return line; and
  wherein the first spring is engaged between said sliding valve element and said valve housing and is operative to urge said sliding valve element away said first valve seat and wherein the second spring is engaged between said sliding valve element and said valve seal and operative to urge said valve seal toward said valve seat.

18. The fluid bypass valve of claim 17 wherein said valve housing defines an outer surface having an exterior diameter smaller than the exterior diameter of the aperture, the outer surface configured to define a cavity with an interior surface of the apeture.

19. The valve according to claim 17 wherein the thermally responsive element is disposed within the valve bearing element.

* * * * *